Figure 1:
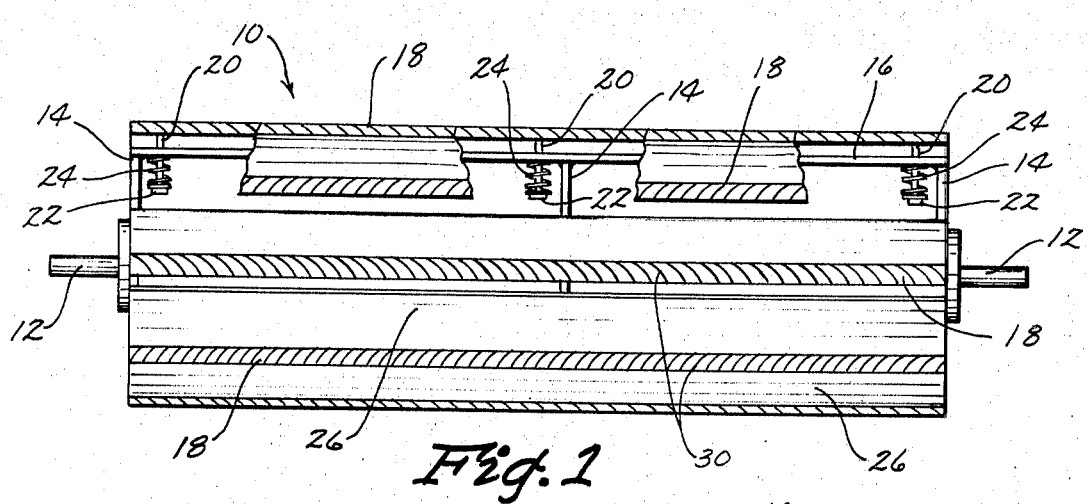

United States Patent [19]
Buchele et al.

[11] 3,817,256
[45] June 18, 1974

[54] SPRING-MOUNTED RASP BAR SHELLER

[75] Inventors: Wesley F. Buchele; Ignatius K. Peprah; Ali R. Mahmoud, all of Ames, Iowa

[73] Assignee: Iowa State University Research Foundation, Inc., Ames, Iowa

[22] Filed: Oct. 12, 1972

[21] Appl. No.: 296,972

[52] U.S. Cl. .................................. 130/6, 130/27 H
[51] Int. Cl. .............................................. A01f 12/20
[58] Field of Search ....... 130/6, 27 R, 27 H, 27 HA, 130/27 G, 27 S

[56] References Cited
UNITED STATES PATENTS

| | | |
|---|---|---|
| 2,320,945 | 6/1943 | Masinn ............................ 130/27 H |
| 2,484,228 | 10/1949 | Isay .................................... 130/6 |
| 3,124,139 | 3/1964 | Stokland ........................ 130/27 H |
| 3,259,134 | 7/1966 | Stokland ........................ 130/27 H |

Primary Examiner—Antonio F. Guida
Attorney, Agent, or Firm—Zarley, McKee & Thomte

[57] ABSTRACT

A spring-mounted rasp bar sheller for corn is described herein. The sheller comprises a plurality of spaced apart rasp bars mounted on a combine or sheller cylinder. Each of the rasp bars has studs secured thereto which extend therefrom through the cylinder backing plates. Springs are mounted on the studs behind the backing plates for yieldably urging the rasp bar inwardly towards the backing plate. Centrifugal force causes the rasp bar to move out radially towards the concave as the cylinder is rotated. During shelling, impact forces on the rasp bars deflect them radially inwardly. Filler plates are also disclosed for preventing the corn from becoming lodged between the backing plate and the rasp bars.

7 Claims, 2 Drawing Figures

PATENTED JUN 18 1974    3,817,256

SPRING-MOUNTED RASP BAR SHELLER

Shelling is the crux of the corn combining problem. The quality of the shelling process is measured, among others, in terms of: (1) shelling efficiency; (2) capacity; and (3) percent damage. The conventional rasp bar cylinder is practically universally adopted in both the combine and the picker sheller and its performance as far as the shelling efficiency and capacity are concerned is satisfactory. The rasp type cylinders have been found to be superior to angle bars in shelling efficiency and kernel damage. However, kernel damage as high as 45 percent is not uncommon when rasp bar cylinders are used.

Damaged corn is an economic loss to both the farmer and the grain marketing industry. Damaged corn is also a source of considerable financial loss when the grain is used for long-term storage, seeding, feeding, etc. since mechanically damaged corn kernels easily mold and deteriorate. The rasp bar cylinders also produce a considerable amount of "fines" which result in more than 1.5 percent yield loss. These "fines" also hinder the drying of the corn and create dust problems during conveying operations.

Therefore, it is a principle object of this invention to provide an improved rasp bar cylinder.

A further object of this invention is to provide a spring-mounted rasp bar sheller for corn or the like.

A further object of this invention is to provide a spring-mounted rasp bar sheller which reduces kernel damage.

A further object of this invention is to provide a spring-mounted rasp bar sheller which has improved shelling efficiency.

A further object of this invention is to provide a spring-mounted rasp bar sheller which substantially reduces kernel damage.

A still further object of this invention is to provide a spring-mounted rasp bar sheller for corn or the like which is economical of manufacture and durable in use.

These and other objects will be apparent to those skilled in the art.

Figure 2:
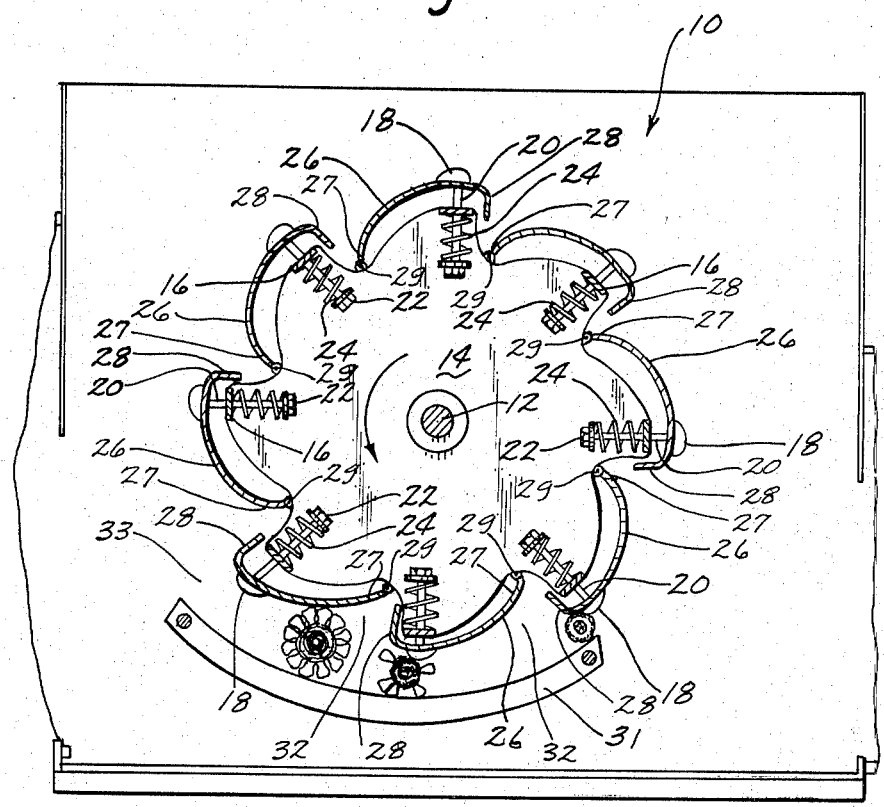

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a front elevational view of the rasp bar sheller of this invention with a portion thereof cut away to more fully illustrate the invention; and FIG. 2 is a sectional view illustrating the relationship of the spring-mounted rasp bar sheller and the combine or sheller concave.

It has been observed in conventional rasp bar cylinder-concave arrangements that threshing of the corn ear is more by impact than by compression and rubbing. The first contact between the slow moving ear and the fast moving rasp bar is a high impact blow. The initial impact blow is followed by a series of repeated blows as the rasp bars move past the ear. Somewhere along the concave, when the speed of the ear has increased, the ear begins to roll. At this time, compression shelling takes place simultaneously with impact shelling as the ear is swept along the concave out of the shelling crescent. It is the high impact shelling described above that inflicts much of the damage on the kernels. The kernel damage is much more prevalent on the kernels which are directly impacted by the rasp bars. Thus, the device of this invention has been developed so as to substantially reduce kernel damage. The device of this invention is referred to generally by the reference numeral 10 and is designed to be mounted in a conventional combine or picker-sheller.

The numeral 12 refers to a cylinder drive shaft having a plurality of spaced apart discs 14 secured thereto for rotation therewith. A plurality of backing plates 16 are secured to the discs 14 and extend thereacross as illustrated in FIG. 1. A rasp bar 18 is spring-mounted on each of the backing plates 16 as illustrated in FIG. 2. It is recommended that three studs 20 be welded to each of the rasp bars 18 and extended through suitable holes formed in the backing plate 16. A nut 22 maintains a spring 24 on each of the studs 20 as illustrated in FIG. 2. The nuts 22 are tightened sufficiently so as to remove the slack from the spring 24. The numeral 26 refers to a flexible filler plate which is mounted inwardly of each of the rasp bars 18 to prevent corn kernels from becoming lodged between the rasp bar 18 and the backing plate 16. Each filler plate 26 has a leading edge 27 and a trailing edge 28. Leading edges 27 are hinged to discs 14 by means of hinges 29. Trailing edges 28 are welded or otherwise attached to the inner radial surfaces of rasp bars 18 so as to move in unison therewith. Each of the rasp bars 18 has a plurality of spaced apart ridges 30 formed therein. The numeral 31 refers to an arcuate concave which is adjustably mounted below the cylinder.

A plurality of tapered cells 32 are formed between each adjacent pair of rasp bars 18 when rasp bars 18 are adjacent concave 31. The tapered shape of filler plates 26 is such that the distance between concave 31 and filler plates 26 is greater adjacent leading edges 27 and is less adjacent trailing edges 28. The distance between rasp bars 18 and concave 31 should be approximately the diameter of a corn cob (5/8 inch) when the sheller is rotating and when rasp bars 18 are in their extreme outer positions. The distance between concave 31 and leading edges 27 is approximately 1 1/2 inches when rasp bars 18 are in their extreme outer position.

In operation, the sheller 10 is rotated by the shaft 12. The centrifugal force of the rotating sheller causes each of the rasp bars 18 to move radially outwardly with respect to the backing plate so that the spring 24 is compressed. Thus, the rasp bars 18 move outwardly towards the concave 31. The corn ears are introduced into the sheller in the area generally referred to by the reference numeral 33. During shelling, impact forces applied to the rasp bars deflect them radially inwardly and cause the rasp bars to vibrate as they move past the ear. The fact that the rasp bars may move radially inwardly from the impact forces greatly reduces kernel damage.

The tapered arrangement of filler plates 26 permits every ear of corn to be impacted by the rasp bar as it is introduced into area 32 to start the shelling process. The ear then rolls past the initially contacted rasp bar 18 into the next cell 32. It presses against leading edge 27 of filler plate 26 and rolls towards trailing edge 28. During this rolling action the ear depresses filler plate 26 radially inwardly in opposition to the centrifugal force of the rotating sheller. The pressure of filler plate 26 against the ear causes the ear to be shelled by the collapse of the tube of kernels surrounding the cob. Eventually the partially shelled ear rolls into the third cell 32. Each time a transfer from one cell to another takes place the ear has a chance to reorient itself so that it becomes more nearly parallel to the axis of the cylinder. The clearance at the end of concave 31 between rasp bars 18 and concave 31 is such that the cob just fits therebetween.

Several tests were conducted to analyze the efficiency of the device of this invention wherein different rotational speeds and different spring forces were employed. For each spring used to mount the rasp bars, the test machine was run at various speeds and readings of rasp bar displacement versus speed were obtained using both the strobotac and a pointer welded to one of the rasp bars. The spring rates of the compression springs were tested by a Rimac Spring Rate Tester. Spring rates were also determined from graphs of displacement versus centrifugal force. Coil springs and Belleville spring washers were employed during the test.

In comparing the results of the test machine with a conventional sheller, it was found that the device of this invention had a lower percent of kernel damage than the conventional sheller. It was also found that the device of this invention had approximately the same shelling efficiency as a conventional sheller when a cylinder spring constant of 644 pounds per inch was employed. It was also found that the optimum performance of the sheller 10 was obtained at high speeds (approximately 600 rpm.).

Thus it can be seen that the sheller accomplishes at least all of its stated objectives.

We claim:

1. In combination,
   a rotatable cylinder means,
   a concave means positioned adjacent the periphery of said cylinder means,
   said cylinder means comprising a plurality of spaced apart, inwardly and outwardly radially movable rasp bars each of said rasp bars having means secured thereto which yieldably urges the rasp bar inwardly away from said concave means.

2. The combination of claim 1 wherein said means secured to said rasp bars for yieldably urging the rasp bar inwardly comprises a spring means.

3. The combination of claim 2 wherein said cylinder means has a backing plate means inwardly of each of said rasp bars, each of said rasp bars having a plurality of spaced apart stud bolts secured thereto extending inwardly through the backing plate means adjacent thereto, a spring means on each of said stud bolts inwardly of the backing plate means, and a tensioning nut on each of said stud bolts.

4. The combination of claim 3 wherein a filler plate means is positioned between each of said rasp bars and the backing plate means adjacent thereto for preventing grain from becoming lodged between said rasp bar and backing plate means.

5. The combination of claim 4 wherein said filler plate means is flexible.

6. The combination of claim 4 wherein hinge means connect said filter plate means to said cylinder means for pivotal movement about an axis parallel to the cylindrical axis of said cylinder means.

7. The combination of claim 6 wherein said filler plate means have a leading edge and a trailing edge, said hinge means being adjacent said leading edge, and means operatively securing said trailing edge to one of said rasp bars.

* * * * *